United States Patent [19]

Kannankeril

[11] Patent Number: 4,956,951

[45] Date of Patent: Sep. 18, 1990

[54] LAMINATED SHEET FOR PROTECTING UNDERGROUND VERTICAL WALLS

[75] Inventor: Charles P. Kannankeril, North Caldwell, N.J.

[73] Assignee: Sealed Air Corporation, Saddle Brook, N.J.

[21] Appl. No.: 371,511

[22] Filed: Jun. 26, 1989

[51] Int. Cl.$^5$ ............................................. E02D 31/02
[52] U.S. Cl. ................................ 52/169.5; 52/169.14; 405/45; 405/36
[58] Field of Search .................... 52/169.5, 169.14; 405/36, 43, 44, 45, 47, 48

[56] References Cited

U.S. PATENT DOCUMENTS

| | | | |
|---|---|---|---|
| 3,654,765 | 4/1972 | Healy et al. | 52/169.5 X |
| 4,503,106 | 3/1985 | Logliano | 428/40 |
| 4,670,071 | 6/1987 | Cooper et al. | 428/40 X |
| 4,681,786 | 7/1987 | Brown | 428/189 X |
| 4,704,048 | 11/1987 | Ahlgrimm | 52/169.5 X |
| 4,730,953 | 3/1988 | Tarko | 52/169.11 X |
| 4,760,674 | 8/1988 | Brand et al. | 52/169.5 |
| 4,840,515 | 6/1989 | Freese | 52/169.11 X |
| 4,880,333 | 11/1989 | Glasser et al. | 52/169.5 X |

*Primary Examiner*—David A. Scherbel
*Assistant Examiner*—Creighton Smith
*Attorney, Agent, or Firm*—Bell, Seltzer, Park & Gibson

[57] ABSTRACT

A laminated sheet which is useful as part of an underground drainage system for a basement is disclosed, and which includes a layer of polystyrene and at least one layer of a polyolefin laminated to one side of the polystyrene layer. The laminated sheet is molded so as to include an array of spaced apart projections extending laterally outwardly from one side of the laminated sheet thereby forming a series of drainage channels.

34 Claims, 2 Drawing Sheets

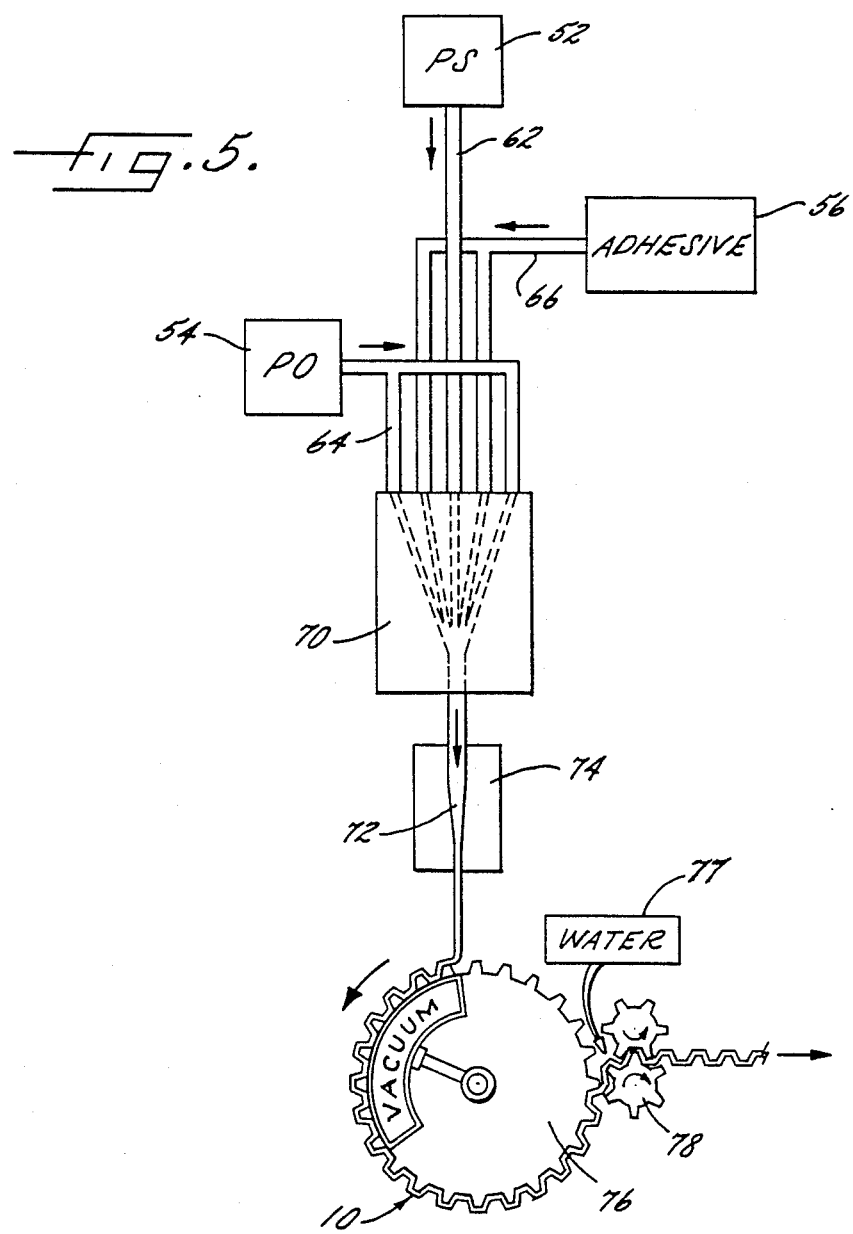

LAMINATED SHEET FOR PROTECTING UNDERGROUND VERTICAL WALLS

FIELD AND BACKGROUND OF THE INVENTION

This invention relates to the protection of underground vertical walls and foundations from the changing effects of water and more particularly to an underground drainage system and a laminated sheet for use therein which facilitates the drainage of ground water to protect underground vertical walls and foundations.

The possibility of severe ground water and moisture damage to underground walls and foundations is a particularly troublesome concern for homeowners and builders. This is especially a problem when the structure includes a basement or the like located below ground. A solution is to remove water penetrating the soil adjacent the wall or foundation. Water removal prevents seepage thereof through small cracks in the wall, and reduces the hydrostatic pressure on the wall thereby preventing the formation of additional cracks.

It is conventional practice to remove moisture by providing a drainage pipe surrounded by gravel wherein the water percolates down through the gravel away from the foundation to a drainage pipe. The foundation also may include a waterproof layer such as a coating of tar. This practice, however, has drawbacks in that the foundation and the waterproof coating invariably develop cracks resulting in leaks. The gravel/drainage pipe system may prevent small leaks from being troublesome, but if the climate and ground are particularly wet, the foundation is highly susceptible to leakage.

In an effort to alleviate the above problem it has been proposed by Daimler et al U.S. Pat. No. 3,754,362 to provide a mat of thermoplastic fibers placed over the outer side of the foundation between the wall and the ground. Water drains downwardly through these filaments to a perforated pipe at the lower end of the mat wherein the pipe collects the water and drains it away from the wall. Another solution to the problem is to use a panel or sheet having channels formed therein such as described in Healy et al U.S. Pat. No. 3,654,765, Gergsland U.S. Pat. No. 3,888,087, Pate et al 4,309,855 and Raidt et al U.S. Pat. No. 4,574,541. These solutions, however, are limited by the materials and the way they are manufactured in that they might be susceptible to cracks and fissures caused by uncareful installation and to fatigue caused by chemical attack.

It is accordingly an object of the invention to provide an underground drainage system which facilitates the drainage of ground water to protect foundations.

It is a further object of the present invention to provide a laminated sheet and a method of producing the same which facilitates the drainage of ground water to protect foundations.

It is a more specific object of the present invention to provide a laminated sheet and a method of producing the same which is both resistant to cracks and fissures and to chemical degradation. Other objects and advantages of the invention will be particularly identified below.

SUMMARY OF THE INVENTION

The laminated sheet of the present invention includes a layer of polystyrene and at least one layer of a polyolefin laminated to one side of the polystyrene layer. The polystyrene layer provides compression strength and creep resistance properties to the laminated sheet, whereas the layer of a polyolefin provides chemical and impact resistance to the laminated sheet. The laminated sheet is formed so as to include an array of spaced apart projections extending laterally outwardly from one side of the laminated sheet and forming a series of drainage channels.

The present invention also includes a method of forming such a laminated sheet which includes the steps of extruding a layer of polystyrene, extruding at least one layer of a polyolefin to form a laminated sheet, and forming in the laminated sheet an array of spaced apart projections extending laterally outwardly from one side thereof and thusly forming a series of drainage channels.

The present invention further includes an underground drainage system for a basement or like. The drainage system comprises a vertical foundation wall and the above-described laminated sheet laid along an exposed face of the foundation wall.

BRIEF DESCRIPTION OF THE DRAWINGS

The foregoing and other objects, features and advantages of the present invention will be made apparent from the following detailed description of the preferred embodiment of the invention, and from the drawings, in which:

FIG. 5 is a diagrammatic representation of the method of forming the laminated sheet of the present invention.

DETAILED DESCRIPTION OF THE INVENTION

Figure 1:
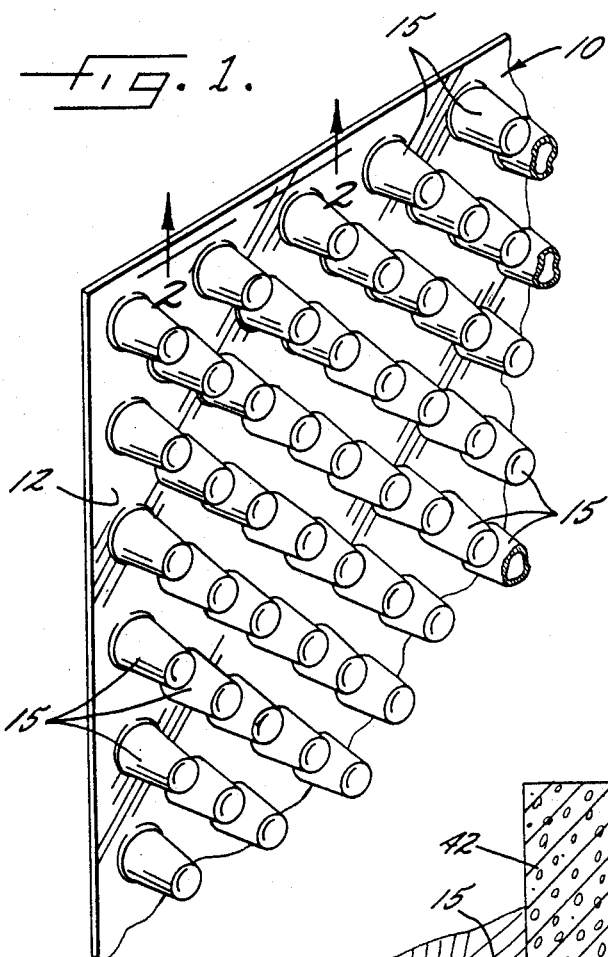
FIG. 1 is a perspective view of a laminated sheet in accordance with the present invention.

The present invention now will be described more fully hereinafter with reference to the accompanying drawings, in which preferred embodiments of the invention are shown. This invention can, however, be embodied in many different forms and should not be construed as limited to the embodiments set forth herein; rather, applicant provides these embodiments so that this disclosure will be thorough and complete, and will fully convey the scope of the invention to those skilled in the art.

Referring now more particularly to the drawings, the laminated sheet of the present invention is indicated generally by the reference character 10. As illustrated in FIGS. 1-4, the laminated sheet 10 has two basic components, namely a polystyrene layer or core 20 and at least one polyolefin layer, and preferably a first polyolefin layer 30 and a second polyolefin layer 40.

As best seen in FIG. 1, the laminated sheet 10 is configured so as to include a generally planar base portion 12, and has an array of spaced apart projections 15 extending laterally outwardly from one side of the base portion 12 and forming a series of channels which facilitate drainage. The projections 15 are formed in the sheet 10 in discrete rows extending both horizontally and vertically preferably in alignment and are spaced apart horizontally and vertically, preferably by a distance of about 0.5 to 1.5 cm. Additionally, the projections 15 may be arranged in alternate rows aligned vertically and horizontally, and have intervening rows staggered horizontally and vertically therefrom. The projections 15 are preferably frusto-conical in shape and have a dimension lateral to and a dimension parallel to the laminated sheet 10 of about the same. For example, the dimension lateral and the dimension parallel may be from about 0.2 to 0.7 cm.

Figure 2:
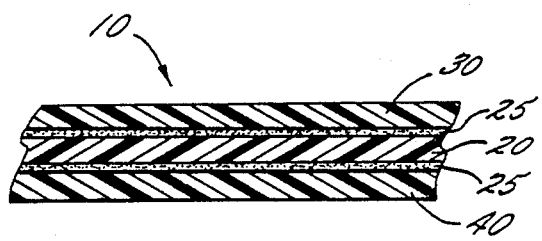
FIG. 2 is an enlarged cross-sectional view of the laminated sheet taken along line 2—2 of FIG. 1.

Referring to FIG. 2, the polystyrene layer or core 20 is preferably crystalline polystyrene and is characterized by compression strength and creep resistance. An exemplary polystyrene resin is sold under the trademark "Polysar" by Polysar Corporation. The polystyrene core 20 may be from about 5 to 30 mils thick.

the polyolefin layers 30,40 are impact resistant and are highly resistance to various chemicals which attack polystyrene such as hydrocarbon solvents. The polyolefin layers 30,40 thus prevents the laminate from developing cracks and fissures. Examplary polyolefins include high density polyethylene, low density polyethylene, linear low density polyethylene and polypropylene with high density polyethylene being preferred. A particularly suitable high density polyethylene resin having a melt index from 2–6 is sold by Exxon Corporation or by Mobil Corporation. The polyolefin layers may each have a thickness of from about 0.5 to 20 mils. Additionally, the polyolefin layers 30,40 may include a UV light inhibitor to prevent the polystyrene from yellowing due to UV light and to eliminate the need to add light inhibitors to the polystyrene.

An adhesive layer 25 also may be provided between the polystyrene core 20 and the polyolefin layers 30,40. Examples of suitable adhesives include commercially available thermoplastic adhesives based upon polyamides, polyesters, polyolefins, polyvinyl acetates, polyvinyl chlorides and the like. Also, solvent-based or water-based adhesives including those based on rubber or urethane compositions, may be employed. An exemplary adhesive is a Bynel polyvinyl acetate adhesive sold by DuPont Corporation of Wilmington, Del.

Figure 3:
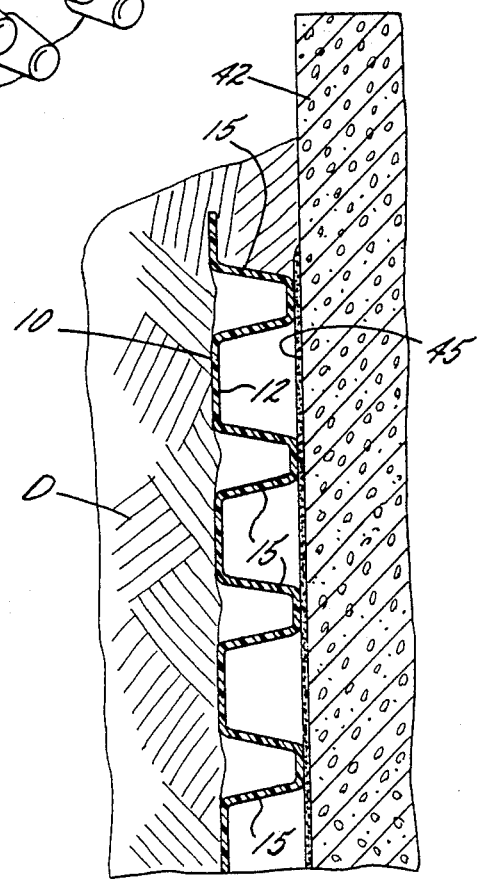
FIG. 3 is a cross-sectional view of an underground drainage system comprising a laminated sheet in combination with a foundation in accordance with the present invention.
Figure 4:
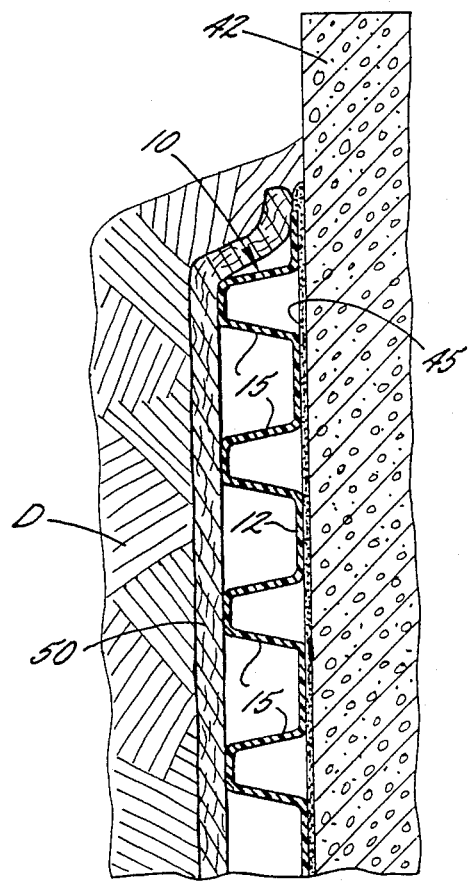
FIG. 4 is a cross-sectional view of an underground drainage system similar to that shown in FIG. 3 which also includes a water permeable filter layer.

As illustrated in FIGS. 3 and 4, the laminated sheet 10 of the present invention is laid against an exposed face of a foundation wall 42 such as the wall for a basement or the like with dirt D filled in against the sheet 10. As shown in FIG. 3, the base portion 12 is spaced from the wall 42 and the projections 15 face inwardly toward the wall with the projections bonded to the wall 42 using an adhesive layer 45. Thus, an open space is defined between the base portion 12 and the wall 42. Any commercially available adhesive such as those described above or a pressure sensitive adhesive such as Kraft paper impregnated with an acrylic polymer emulsion, may be used as the adhesive layer 45. Additionally, a pair of the laminated sheets 10 may be bonded together with the base portions 12 adjacent each other and With the projections 15 extending outwardly from the wall 42 and also being bonded to the wall 42.

In FIG. 4, an embodiment is disclosed wherein the base portion 12 is adjacent the wall 42 and secured thereto by an adhesive layer 45, and the projections 15 extend outwardly from the wall. Also, a water permeable filter material layer 50 overlies the extremities of the projections and is secured to the projections at the tops thereof by a suitable adhesive. Thus, an open space is defined between the layer 50 and the base portion 12 of the sheet. The water permeable filter layer 50 may be any cloth or polymeric material which is permeable to water by means of a plurality of very small capillaries or openings which extend through the material. This construction allows water to pass through the filter material layer 50, but prevents dirt and other larger particles from passing therethrough so as to accumulate on the projections 15 and clog the drainage channels. This filter layer also may be used in the embodiment wherein the projections 15 face inwardly toward the wall 42.

In operation, the laminated sheet 10 and the underground drainage system utilizing it, facilitate the drainage of ground water to protect the foundation. The polystyrene layer 20 provides compression strength and creep resistance whereas the polyolefin layers 30,40 provide chemical and impact resistance. Additionally, the laminated sheet 10 prevents radon gas leaking into the basement through cracks or by diffusion through the foundation wall 42.

Referring now to FIG. 5, the method for forming the laminated sheet 10 is shown. Heated containers 52,54 and optionally 56 serve as sources of polystyrene, high density polyethylene and an adhesive respectively. The polystyrene is heated in container 52 to approximately 470° F.; the polyethylene is heated in container 54 to approximately 465° F.; and the adhesive is heated in container 56 to approximately 400° F. Conduits 62,64 and 66 supply the heated material to a coextruder 70 under a pressure of about 2000 to 5000 p.s.i. to form a unitary stream 72 of generally circular cross-section. The stream 72 passes into an extrusion die 74 maintained at a temperature of from about 450° to 500° F. for coextrusion into a continuous laminated sheet 10. The sheet 10 then passes over a mold 76 such as a rotating cylindrical male mold having an underlying vacuum chamber positioned at a fixed location adjacent the point at which the sheet 10 initially engages the mold. The vacuum chamber serves to form the projections 15 in the sheet. The sheet is cooled by a water spray 77 as it leaves the mold, and the sheet then passes through pull rolls 78 to strip the sheet from the mold 76. It is to be noted that the polyolefin layers 30, 40 facilitate the demolding process by providing a layer which is more flexible and smooth than a polystyrene layer alone and which is easily released from the mold 76. Additionally, the polyolefin layers 30,40 also eliminate the need to blend rubbery polymers into the polystyrene to make it flexible. The optional water permeable filter material layer 50 may be secured to the sheet 10 at this point or at a later time such as when the sheet 10 is laid against the foundation wall 42.

In the drawings and specification, there have been disclosed preferred embodiments of the invention and, although specific terms are employed, they are used in a generic and descriptive sense only and not for the purpose of limitation, the scope of the invention being set forth in the following claims.

What is claimed is:

1. A laminated sheet useful to facilitate the drainage of ground water to protect underground vertical walls and foundations when placed thereagainst, said laminated sheet having an array of spaced apart projections extending laterally outwardly from one side thereof and forming a series of drainage channels, and comprising a layer of crystalline polystyrene providing compression strength and creep resistance properties to said laminated sheet and at least one non-pervious layer of a polyolefin laminated to said crystalline polystyrene layer and providing chemical and impact resistance to said laminated sheet.

2. A laminated sheet according to claim 1 wherein said polyolefin is selected from the group consisting of high density polyethylene, low density polyethylene, linear low density polyethylene and polypropylene.

3. A laminated sheet according to claim 1 wherein an adhesive layer is located between said polystyrene layer and said polyolefin layer.

4. A laminated sheet according to claim 3 wherein said adhesive layer is an adhesive selected from the group consisting of polyamides, polyesters, polyolefins, polyvinyl acetates and polyvinyl chlorides.

5. A laminated sheet according to claim 1 wherein said polystyrene layer has a thickness of from about 5 to 30 mils and said high density polyethylene layer has a thickness of from about 0.5 to 20 mils.

6. A laminated sheet according to claim 1 wherein said projections extend outwardly, and have a dimension lateral to and a dimension parallel to said laminated sheet of about the same.

7. A laminated sheet according to claim 1 wherein said projections are formed in said laminated sheet in discrete rows extending both horizontally and vertically and are spaced apart in both the horizontal and vertical directions.

8. A laminated sheet according to claim 7 wherein said projections are arranged in alternate rows aligned horizontally and vertically, and intervening rows are staggered horizontally and vertically therefrom.

9. A laminated sheet according to claim 7 wherein said projections are substantially uniformly spaced apart by a distance of from about 0.5 to 1.5 cm.

10. A laminated sheet according to claim 7 wherein said projections have a frusto-conical shape.

11. A laminated sheet according to claim 1 additionally including a water permeable filter material layer overlying and secured to said projections at the tops thereof.

12. A laminated sheet according to claim 1 wherein said polyolefin layer includes a UV light inhibitor.

13. A coextruded laminated sheet useful to facilitate the drainage of ground water to protect underground vertical walls and foundations when placed thereagainst, said laminated sheet having an array of spaced apart projections extending laterally outwardly from one side thereof and forming a series of drainage channels, and comprising a core of crystalline polystyrene providing compression strength and creep resistance properties to said laminated sheet, a first non-pervious layer of high density polyethylene overlying and laminated to one side of said core and a second non-pervious layer of high density polyethylene overlying and laminated to the other side of said core, said first and second layers providing chemical and impact resistance to said laminated sheet.

14. A coextruded laminated sheet according to claim 13 wherein an adhesive layer is located between said core layer and said first layer and between said core layer and said second layer.

15. A coextruded laminated sheet according to claim 14 wherein said adhesive layer is an adhesive selected from the group consisting of polyamides, polyesters, polyolefins, polyvinyl acetates and polyvinyl chlorides.

16. A coextruded laminated sheet according to claim 13 wherein said crystalline polystyrene core layer has a thickness of from about 5 to 30 mils and said first and second high density polyethylene layers each have a thickness of from about 0.5 to 20 mils.

17. A coextruded laminated sheet according to claim 17 wherein said projections extend outwardly, and have a dimension lateral to and a dimension parallel to said laminated sheet of about the same.

18. A coextruded laminated sheet according to claim 13 wherein said projections are formed in said laminated sheet in discrete rows extending both horizontally and vertically and are spaced apart in both the horizontal and vertical directions.

19. A coextruded laminated sheet according to claim 18 wherein said projections are arranged in alternate rows aligned horizontally and vertically, and intervening rows are staggered horizontally and vertically therefrom.

20. A coextruded laminated sheet according to claim 17 wherein said projections are substantially uniformly spaced apart by a distance of from about 0.5 to 1.5 cm.

21. A coextruded laminated sheet according to claim 18 wherein said projections have a frusto-conical shape.

22. A coextruded laminated sheet according to claim 13 additionally including a water permeable filter material layer overlying and secured to said projections at the tops thereof.

23. A coextruded laminated sheet according to claim 13 wherein said high density polyethylene layer includes a UV light inhibitor.

24. An underground drainage system for a basement or the like comprising a vertical foundation wall in combination with a laminated sheet laid along an exposed face of said foundation wall, said laminated sheet having a planar base portion and an array of spaced apart projections extending laterally outwardly from one side of said base portion and forming a series of drainage channels, and comprising a layer of crystalline polystyrene providing compression strength and creep resistance properties to said laminated sheet, and at least one non-pervious layer of polyolefin overlying and laminated to one side of said crystalline polystyrene layer, and providing chemical and impact resistance to said laminated sheet.

25. A laminated sheet according to claim 24 wherein said polyolefin is selected from the group consisting of high density polyethylene, low density polyethylene, linear low density polyethylene and polypropylene.

26. An underground drainage system according to claim 25 wherein said base portion is spaced from said foundation wall and said projections extend toward said foundation wall and so as to define an open space between said base portion and said foundation wall.

27. An underground drainage system according to claim 25 wherein said base portion is disposed immediately adjacent said foundation wall and said projections extend outwardly therefrom.

28. An underground drainage system according to claim 27 further comprising a layer of water permeable filter material overlying the extremeties of said projections and so as to define an open space between said filter material and said base portion.

29. An underground drainage system according to claim 25 further comprising a layer of adhesive interposed between the surface of said sheet and the adjacent exposed face of said foundation wall to bond the sheet thereto.

30. An underground drainage system according to claim 26 wherein said sheet further comprises an adhesive layer located between said polystyrene layer and said polyolefin layer.

31. An underground drainage system according to claim 28 wherein said adhesive layer is an adhesive selected from the group consisting of polyamides, polyesters, polyolefins, polyvinyl acetates and polyvinyl chlorides.

32. An underground drainage system according to claim 25 wherein said polystyrene layer has a thickness of from about 5 to 30 mils and said polyolefin layer has a thickness of from about 0.5 to 20 mils.

33. An underground drainage system according to claim 25 wherein said laminated sheet comprises two of said layers of polyolefin overlying respective opposite sides of said polystyrene layer, and an adhesive layer between each of said polyolefin layers and said polystyrene layer.

34. An underground drainage system according to claim 33 wherein said polyolefin layer is high density polyethylene.

* * * * *

UNITED STATES PATENT AND TRADEMARK OFFICE
CERTIFICATE OF CORRECTION

PATENT NO. : 4,956,951

DATED : September 18, 1990

INVENTOR(S) : Charles P. Kannankeril

It is certified that error appears in the above-identified patent and that said Letters Patent is hereby corrected as shown below:

Column 3, line 20, "the" should be -- The --;

Column 3, line 60, "With" should be -- with --;

Column 6, line 5, "17" should be -- 13 --.

Signed and Sealed this

Seventeenth Day of December, 1991

*Attest:*

HARRY F. MANBECK, JR.

*Attesting Officer*   *Commissioner of Patents and Trademarks*